(12) United States Patent
Fournier et al.

(10) Patent No.: US 8,966,605 B2
(45) Date of Patent: Feb. 24, 2015

(54) SECURITY TOKEN FOR SECURELY EXECUTING AN APPLICATION ON A HOST COMPUTER

(75) Inventors: Jacques Fournier, Marseilles (FR); Pierre Girard, La Destrousse (FR); Philippe Proust, Marseilles (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 13/698,588

(22) PCT Filed: May 10, 2011

(86) PCT No.: PCT/EP2011/057474
§ 371 (c)(1),
(2), (4) Date: Nov. 16, 2012

(87) PCT Pub. No.: WO2011/144488
PCT Pub. Date: Nov. 24, 2011

(65) Prior Publication Data
US 2013/0061312 A1   Mar. 7, 2013

(30) Foreign Application Priority Data

May 17, 2010   (EP) ................................ 10305516

(51) Int. Cl.
*G06F 21/00* (2013.01)
*G06F 21/12* (2013.01)
*G06F 21/14* (2013.01)
*G06F 21/34* (2013.01)

(52) U.S. Cl.
CPC .............. *G06F 21/123* (2013.01); *G06F 21/14* (2013.01); *G06F 21/34* (2013.01); *G06F 2221/2107* (2013.01); *G06F 2221/2153* (2013.01)
USPC .............................................. 726/9; 709/223

(58) Field of Classification Search
None
See application file for complete search history.

(56) References Cited

U.S. PATENT DOCUMENTS

| | | | |
|---|---|---|---|
| 5,892,899 A | 4/1999 | Aucsmith et al. | |
| 6,088,802 A * | 7/2000 | Bialick et al. | 726/3 |
| 6,643,775 B1 | 11/2003 | Granger et al. | |
| 7,149,783 B2 * | 12/2006 | Frolik et al. | 709/207 |
| 8,572,386 B2 * | 10/2013 | Takekawa et al. | 713/176 |
| 2005/0210275 A1 * | 9/2005 | Homing et al. | 713/190 |
| 2009/0235089 A1 * | 9/2009 | Ciet et al. | 713/190 |
| 2009/0249492 A1 | 10/2009 | Sorensen | |
| 2012/0198538 A1 * | 8/2012 | Spring et al. | 726/9 |

FOREIGN PATENT DOCUMENTS

| | | |
|---|---|---|
| EP | 0 175 557 A1 | 3/1986 |
| WO | WO 97/48203 A1 | 12/1997 |

OTHER PUBLICATIONS

European Search Report dated Nov. 18, 2010.

* cited by examiner

*Primary Examiner* — Gilberto Barron, Jr.
*Assistant Examiner* — Wayne An
(74) *Attorney, Agent, or Firm* — Buchanan Ingersoll & Rooney PC

(57) ABSTRACT

The invention relates to a security token comprising a communication interface adapted to communicate with a host computer; a security module, comprising encryption based security features; and a non volatile memory storing at least an application to be uploaded and executed in a host computer. The application makes use of the security features when executed in a host computer in communication with the communication interface. The security token is adapted to modify the content of the application as uploaded or its execution parameters at successive connections of the security token to a host computer.

10 Claims, 2 Drawing Sheets

SECURITY TOKEN FOR SECURELY EXECUTING AN APPLICATION ON A HOST COMPUTER

FIELD OF THE INVENTION

The present invention relates to the software applications providing security features, and more specifically to the restricted execution of such software applications on a host computer based on a security token.

BACKGROUND OF THE INVENTION

A growing number of software applications have security requirements before they can be run on a host computer. For instance, applications for securing an access to a mobile network, for securing bank transactions or for guaranteeing a remote encrypted data access are often based on an authenticity test. User authentication is carried out by collecting a password on a host computer. A cryptoprocessor located in a security token checks the authenticity of the input password before the execution of the application is validated.

Host computers in charge of executing security applications may belong to a wide range of users. Such host computers may be insufficiently protected, either because the operating system has intrinsic failures or was not correctly updated, or because the computer does not run an appropriate antivirus or firewall. Distributors of security tokens do not have a good hold on the security level of the host computers of the end users. Thus, even if the security provided by a security token is satisfactory, it can be circumvented by a fraudulent use of a host computer to which the token is connected.

Security tokens may store different applications in an embedded non volatile memory. Security tokens may have limited processing capacities in order to keep an acceptable cost. Thus, such security tokens are not suitable for executing all the applications stored therein or cannot provide a user friendly execution environment. Thus, some security applications either have to be uploaded or stored in the host computer. A fraudulent uploading or execution can be prevented through authentication. The applications can be launched and can use authentication parameters provided by the cryptoprocessor. A secured channel between the launched application and the cryptoprocessor is usually used to preserve the confidentiality of the communication. However, even if strong cryptographic algorithms are used for the secured channel, the security of the host computer can reveal insufficient like recited previously.

For instance, if the cryptoprocessor and the application firstly agree on initial pre-shared keys to be used on the secured channel, an attacker could carry out some reverse-engineering on the application executed on the host computer. The attacker could then devise a virus that would systematically use or break the secure channel on other devices embedding this application. Another attack consists in hooking to the entry point of the layer managing the secure channel to discreetly use its features. Still another attack could spy sensitive data before they are encrypted. Thus, all the security tokens providing identical applications could be subject to corresponding attacks.

To overcome this problem, running such applications in a trusted environment on the host computer is not very flexible and is not applicable to any host computer.

SUMMARY OF THE INVENTION

It is therefore an object of the present invention to provide a security token comprising:

a communication interface adapted to communicate with a host computer;

a security module, comprising encryption based security features;

a non volatile memory storing at least an application to be uploaded and executed in a host computer, said application making use of said security features when executed in a host computer in communication with the communication interface.

The security token is adapted to modify the content of the application as uploaded or its execution parameters at successive connections of the security token to a host computer.

The security module can be adapted to carry out said modification.

The security token can be adapted to modify the content of the uploaded application or its execution parameters at each connection of the security token to a host computer.

The result of said modification can be random.

The modified content or the modified execution parameters may be adapted to induce modifications of the execution of the application in the host computer.

The security token can be adapted to obfuscate the code of the application before its upload by a host computer.

The security token can be adapted to rename data within the application before its upload by a host computer.

The security token can be adapted to modify data links of the application before its upload by a host computer.

Said application may comprise several execution modules, and the security token may be adapted to randomly select the execution modules executed respectively in the security token or in the host computer.

The invention also relates to a method for uploading and executing an application in a host computer, comprising the following steps:

the host computer requests the execution of an application stored in the non volatile memory of a security token in communication with said host computer, said application making use of security features comprised in a security module of the security token when executed on the host computer;

further to the request, the security token generates a modified application or modified execution parameters of the application, and uploads the modified application or the modified execution parameters;

the uploaded application is executed in said host computer.

BRIEF DESCRIPTION OF THE DRAWINGS

The advantage of the present invention will become apparent from the following description of several embodiments with reference to the accompanying drawings, in which.

DETAILED DESCRIPTION OF EMBODIMENTS OF THE INVENTION

According to the invention, a security token comprises a communication interface adapted to communicate with a host computer and a security module comprising encryption based security features. A non volatile memory stores an application to be uploaded and executed in the host computer. This application makes use of the security features when executed in the host computer. At successive connections of the security token, the security token modifies the content of the uploaded application or its execution parameters.

The invention provides an improved execution security since a potential virus or hacker will be facing a varying application. A given virus will not be suitable at each new connection, even with identical security tokens. These results are obtained without requesting specific hardware or specific software configurations on the host computer. These results are obtained even when the host computer is not fully trusted, either because its security is not guaranteed or because its user tries to make a fraudulent use from it. These results are also obtained without requesting the security applications to be specifically personalized on each security token.

Figure 1:
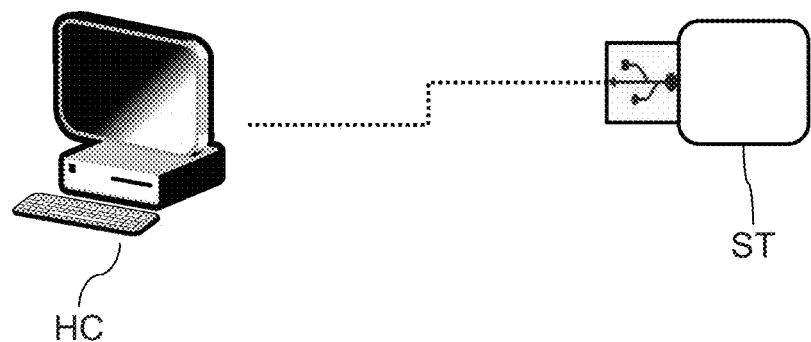
FIG. 1 illustrates a security token connected to a host computer.
Figure 2:
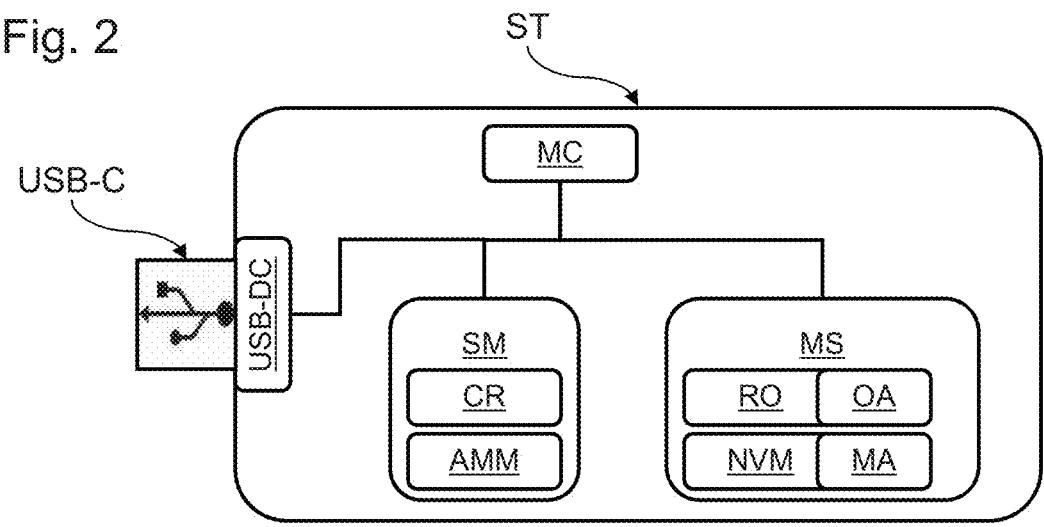
FIG. 2 is a schematic view of the architecture of a token according to an embodiment of the invention.

FIG. 1 illustrates a security token ST connected to a host computer HC. FIG. 2 is a schematic view of the architecture of the token ST according to an embodiment of the invention.

The security token ST comprises a communication interface to be connected with the host computer HC. In the example illustrated at FIG. 2, the communication interface of the token ST comprises a USB connector USB-C and a USB device controller USB-DC. The communication interface of the security token ST can be of any other suitable type. The communication interface can either be a wired or a wireless communication interface. A wired communication interface at the PCMCIA format can notably be used.

The security token ST comprises a microcontroller MC. The microcontroller MC can be provided with a processor, a non volatile memory and a random access memory. The security token ST also comprises a security module SM. The security module SM comprises a cryptographic and authenticity module CR. This module CR is known per se by someone ordinary skilled in the art and comprises encryption based security features. The module CR can notably establish an encrypted communication channel with the host computer HC or carry out a user authentication. Additionally, the security module SM further comprises an application modification module AMM. The application modification module could also be included in the microcontroller MC.

The security token ST also comprises a mass storage MS, for instance a NAND-Flash memory. The mass storage MS comprises a read only memory area storing an original version of an application OA. The application OA can be an application for securing an access to a mobile network, for securing bank transactions or for guaranteeing a remote encrypted data access.

The application OA can be stored in different formats like .exe files, .com files or in CD-ROM compliant format. The application OA is designed to be uploaded and executed on the host computer HC. Once executed on the host computer HC, the application OA makes uses of security features of the cryptographic module CR. The mass storage MS further comprises a non volatile memory area NVM. This memory area NVM stores a modified application MA or modified components of an application.

The application modification module AMM is adapted to either modify the content of the application uploaded by the host computer HC or to modify the execution parameters of this application by the host computer HC. The application modification module AMM carries out modifications in such a way that the functional services provided by the executed application remain the same.

Different types of modifications can be carried out. Some examples of modification techniques are:

modifying the application to be uploaded by obfuscating the code of the original application OA;

modifying the application to be uploaded by renaming data within the application;

modifying the application to be uploaded by modifying data links of the application;

modifying the application to be uploaded by modifying the selection of functional modules uploaded on the host computer;

modifying the application execution parameters by requesting a random execution of execution modules either on the host computer or on the security token.

When the application modification module AMM modifies the application, the modified application MA generated can be stored in the non volatile memory NVM to be uploaded by the host computer HC. The modified content or the modified execution parameters are preferably adapted to induce modifications of the execution of the application in the host computer, in order to make this execution less predictable for a fraudulent user.

Modifying the uploaded functional modules: in practice, the application is designed as an automaton having different functional modules. The security module SM randomly selects if each functional module has to be uploaded and executed on the host computer or simply has to be executed in the security token.

The modified application can be uploaded in the host computer to either be transitorily stored in the host computer for the duration of its execution. The security module may forbid a later access to its security features if the modified application corresponds to a previous upload. Thus, the security module may force the host computer to upload a newly modified application before it allows this executed application to access its security features.

Figure 3:
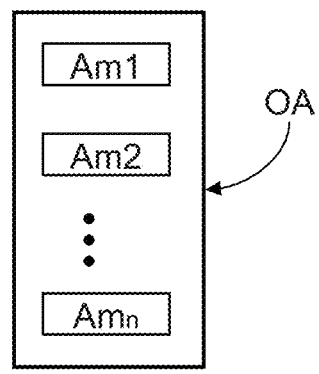
FIG. 3 illustrates the structure of a security application to carry out an embodiment of the invention.

Modifying the execution parameters can be carried out as follows: uploading an application on the host computer having several different functional modules also stored on the security token. These functional modules are thus duplicated on the host computer after the upload. The application OA of FIG. 3 is stored in a security token. The application OA comprises several functional modules $Am1$ to $Am_n$. The application OA is designed to have these functional modules interact with each other when some of them are executed on the host computer and others are executed on the security token. The security module SM randomly selects for each of these functional modules whether it is executed on the security token D or on the host computer HC.

Figure 4:
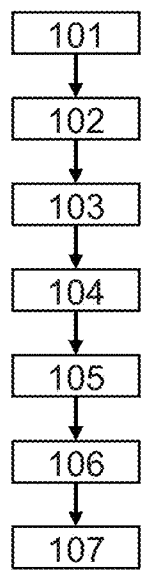
FIG. 4 is a diagram illustrating a method according to the invention.

FIG. 4 illustrates different steps of an application modification process where the application code is obfuscated. At step 101, a security token is connected to a host computer. At step 102, the user of the host computer is authenticated by the security token. At step 103, the host computer requests to upload and execute an application making use of security features of the security module of the security token. At step 104, the security module accesses to the original application stored in a non volatile memory of the security token and decides to modify this application. At step 105, the security module generates an obfuscated version of the original application and stores this modified application in the non volatile memory. At step 106, the modified application is executed by the host computer and accesses to the security features of the security token. At step 107, the execution of the application is terminated and the application is deleted from the host computer.

Modifications can be carried out dynamically when an upload is requested by the host computer HC.

The above modifications of the uploaded application and of the execution parameters can be combined in order to improve the protection of the execution of the application on the host computer HC. The combination of these modifications can either correspond to predetermined settings or can be randomly set at each connection of the security token to the host computer HC.

Advantageously, the result of the modification, either on the application or on its execution parameters, is random. Such a modification is thus unpredictable by a hacker. Advantageously, the security module also randomly chooses one of the modification possibilities among those recited above. Such a modification is thus even less predictable since the kind of modification cannot be known beforehand from a hacker.

Modifications can be carried out at each connection of the security token to the host computer, or at predetermined or at unpredictable moments. The security token can store a connection counter in order to determine if a new modification of the application or of its execution parameters have to be carried out.

The microcontroller and/or the security module and/or the mass storage can be embedded in a common element, like a smartcard. Though the USB device controller USB-DC is illustrated as an independent component at FIG. 2, this controller can also be included in a common electronic component with the security module SM.

The invention claimed is:

1. A security token comprising:
   a communication interface adapted to communicate with a host computer;
   a security module, comprising encryption based security features;
   a non volatile memory storing at least an application to be uploaded and executed in the host computer, said application making use of said security features when executed in the host computer in communication with the communication interface;
   wherein the security token is configured to modify the content of the application as uploaded or its execution parameters at successive connections of the security token to the host computer.

2. Security token according to claim 1, wherein the security module is configured to carry out said modification.

3. Security token according to claim 1, wherein the security token is configured to modify the content of the uploaded application or its execution parameters at each of the successive connections of the security token to the host computer.

4. Security token according to claim 1, wherein the manner in which said modification is made to the application or its execution parameters is randomly determined.

5. Security token according to claim 1, wherein the modified content or modified execution parameters are adapted to induce modifications of the execution of the application in the host computer.

6. Security token according to claim 1, wherein the security token is configured to obfuscate the code of the application before its upload to the host computer.

7. Security token according to claim 1, wherein the security token is configured to rename data within the application before its upload to the host computer.

8. Security token according to claim 1, wherein the security token is configured to modify data links of the application before its upload to the host computer.

9. Security token according to claim 1, wherein said application comprises several execution modules, and wherein the security token is configured to randomly select the execution modules executed respectively in the security token or in the host computer.

10. Method for uploading and executing an application in a host computer, comprising the following steps:
   the host computer requests the execution of an application stored in non-volatile memory of a security token in communication with said host computer, said application making use of security features comprised in a security module of the security token when executed on the host computer;
   further to the request, the security token generates a modified application or execution parameters of the application modified at successive connections of the security token to the host computer, and uploads the modified application or the modified execution parameters;
   the uploaded application is executed in said host computer.

* * * * *